US006867728B1

(12) United States Patent
Hanna et al.

(10) Patent No.: US 6,867,728 B1
(45) Date of Patent: Mar. 15, 2005

(54) METHODS AND SYSTEMS FOR IDENTIFYING SIGNALS-OF-INTEREST

(75) Inventors: Craig A. Hanna, Vestal, NY (US); James A. Johnson, Newark Valley, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/701,473

(22) Filed: Nov. 6, 2003

(51) Int. Cl.⁷ ............................................... G01S 13/00
(52) U.S. Cl. ..................... 342/91; 342/13; 342/20; 342/89; 342/156; 342/159; 342/165; 342/173; 342/175; 342/195
(58) Field of Search .................. 342/13–20, 147, 342/156, 89–103, 159, 165, 166–175, 192–197; 704/243, 245; 375/224, 227, 324, 326, 342; 382/224, 228; 455/179.1, 182.1, 182.2

(56) References Cited

U.S. PATENT DOCUMENTS

| 4,074,264 | A | * | 2/1978 | Wilmot ........................ 342/90 |
| 4,489,319 | A | * | 12/1984 | Hansen ........................ 342/93 |
| 5,142,554 | A | | 8/1992 | Stribling et al. |
| 5,179,542 | A | | 1/1993 | Reese et al. |
| 5,402,131 | A | * | 3/1995 | Pierce ......................... 342/194 |
| 5,485,157 | A | | 1/1996 | Long |
| 5,537,488 | A | * | 7/1996 | Menon et al. ............... 704/245 |
| 5,694,342 | A | * | 12/1997 | Stein ........................... 342/159 |
| 5,694,435 | A | * | 12/1997 | Kolle et al. .................. 375/342 |
| 5,703,964 | A | * | 12/1997 | Menon et al. ............... 382/228 |
| 5,706,013 | A | | 1/1998 | Melvin et al. |
| 5,729,571 | A | | 3/1998 | Park et al. |
| 5,867,539 | A | | 2/1999 | Koslov |
| 5,901,173 | A | * | 5/1999 | Stephens et al. ............. 375/227 |
| 5,940,748 | A | * | 8/1999 | Daughtry et al. ......... 455/182.2 |
| 6,002,723 | A | | 12/1999 | Chethik |
| 6,038,526 | A | * | 3/2000 | Stein ........................... 342/159 |
| 6,040,797 | A | * | 3/2000 | Hofele ......................... 342/159 |
| 6,043,770 | A | * | 3/2000 | Garcia et al. ................ 342/159 |
| 6,094,463 | A | * | 7/2000 | Stephens et al. ............. 375/326 |
| 6,304,828 | B1 | | 10/2001 | Swanick et al. |
| 6,369,749 | B1 | * | 4/2002 | Frey, Jr. ....................... 342/93 |
| 6,426,983 | B1 | | 7/2002 | Rakib et al. |
| 6,513,136 | B1 | | 1/2003 | Barker |
| 6,717,545 | B2 | * | 4/2004 | Dizaji et al. .................. 342/93 |
| 2003/0174088 | A1 | | 9/2003 | Dizaji et al. |

* cited by examiner

Primary Examiner—Bernarr E. Gregory
(74) Attorney, Agent, or Firm—John E. Curtin; Harness, Dickey & Pierce, P.L.C.

(57) ABSTRACT

Signals-of-interest are identified by distinguishing such signals from signals constituting environmental or internal receiver noise. A received signal is rapidly sampled in order to set a dynamic, system threshold. Signals above the threshold constitute signals-of-interest.

24 Claims, 2 Drawing Sheets

METHODS AND SYSTEMS FOR IDENTIFYING SIGNALS-OF-INTEREST

GOVERNMENT INTERESTS

This invention was made with U.S. Government support under Contract No. N00019-93-C-0196 Mod. #P00062 awarded by the United States Navy. The U.S. Government has certain rights in this invention.

BACKGROUND OF THE INVENTION

The popularity of mobile and cellular devices (hereafter collectively referred to as "mobile" devices) has brought with it many benefits. It has, however, also raised new concerns and challenges. For example, existing airborne, electronic support measure (ESM) receivers used by military aircraft and the like are designed to identify certain signals above a given noise threshold. For example, the signal transmitted by a radar associated with a surface-to-air missile battery. Existing ESM receivers rely on the assumption that most signals above an internal receiver noise level are probably signals from a radar site. However, with the advent of mobile technology, this is not always the case. Some mobile devices (e.g., telephones) emit signals which are above the internal receiver noise level. Because of this, existing ESM receivers sometimes have a difficult time determining if a signal above an internal receiver noise level is that of a radar or of a mobile phone, for example. In a battlefield environment, it is critical to be able to determine what signals correspond to enemy radar sites (so-called "signals-of-interest") and what signals correspond to mobile devices. The latter can be ignored while the former cannot because to do so risks the lives of those onboard a military aircraft.

Accordingly, it is desirable to provide for methods and systems which are capable of identifying signals-of-interest from all other unwanted signals.

SUMMARY OF THE INVENTION

The present invention provides methods and systems that identify signals-of-interest from unwanted signals (e.g., environmental and internal receiver noise) by: rapidly sampling the amplitude and interferometer phase of a received signal even if the signal is below an existing system threshold; calculating a first average and standard deviation from amplitude signal samples; identifying signal samples that have amplitude levels substantially above the calculated, first average amplitude; identifying signal samples that have substantially the same interferometer phase as an adjacent signal sample; estimating a noise level using some of the signal samples, wherein the estimation excludes those samples which are identified as having amplitude levels substantially above the calculated first average amplitude and excludes those samples that are identified as having substantially the same interferometer phase as an adjacent signal sample; and setting a dynamic, system threshold above the estimated noise level.

Received signals that are above the threshold constitute signals-of-interest. The signals sampled do not contain a signal that was originally transmitted by the system.

Systems provided by the present invention may include a receiver and antenna combination (e.g., a fixed-wing airborne receiver, a rotary-wing airborne receiver, an ESM receiver or radar warning receiver combined with two or more antennas).

DETAILED DESCRIPTION OF THE INVENTION

The present invention allows ESM receivers and the like to identify signals-of-interest which may be hidden by signals originating from mobile devices, other man-made devices, natural noise sources (which may be collectively referred to as "environmental noise") or internal receiver noise by periodically sampling the amplitude and phase of signals which are impinging upon antennas connected to the receiver and then adjusting a system threshold after processing such samples to separate the signals-of-interest from environmental or internal receiver noise.

Figure 1:
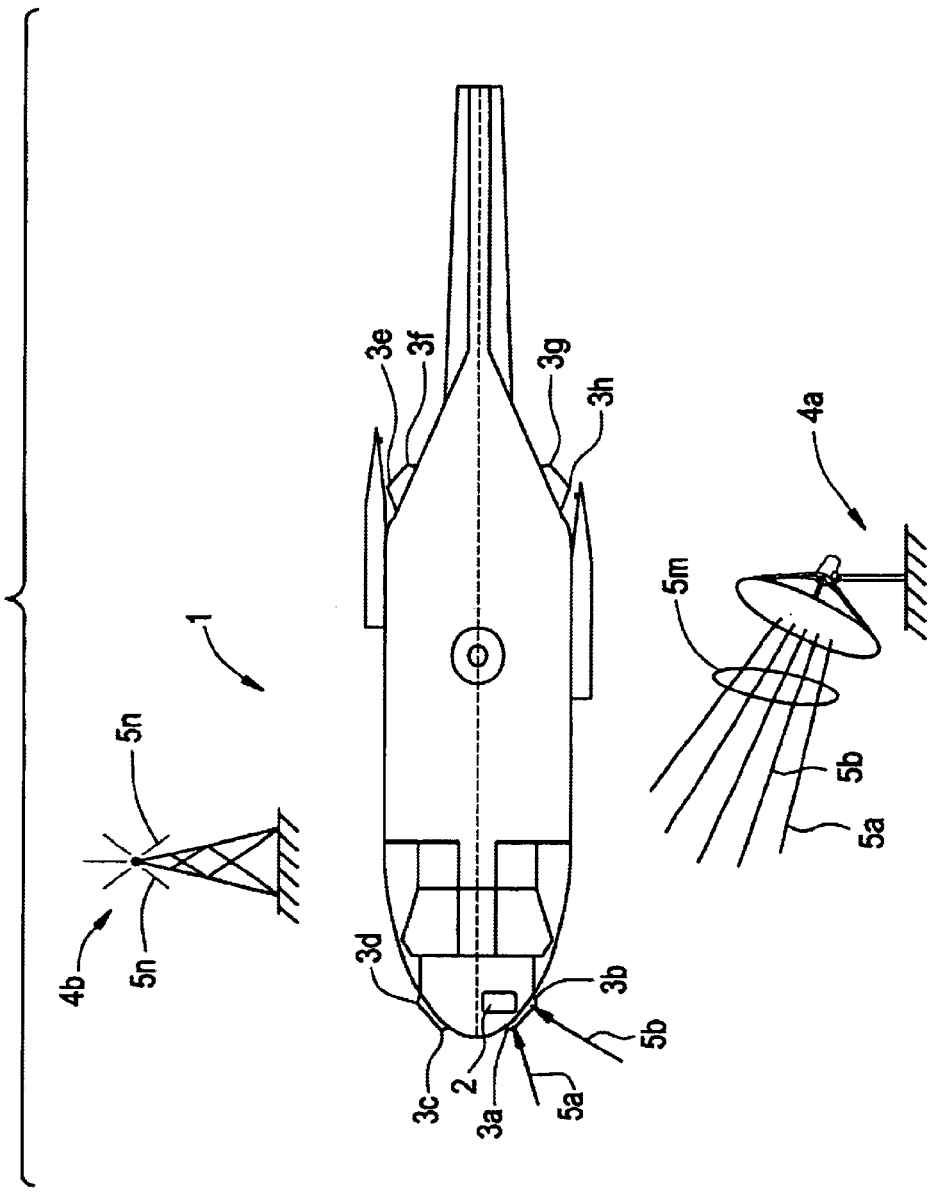
FIG. 1 depicts a top view of a simplified diagram of an airborne system for identifying signals-of-interest according to one embodiment of the present invention.

Referring now to FIG. 1, there is shown a top view of an airborne system 1 (e.g., a helicopter) comprising a receiver 2 connected to antennas 3a–3h (connections not shown). The eight antennas 3a–3h are paired into 4 pairs of antennas.

To simplify an explanation of the present invention, the discussion which follows focuses, for now, on just a single pair of antennas 3a, 3b. Impinging upon each antenna 3a, 3b are signals 5a, 5b, respectively. Both of these signals 5a, 5b comprise both signals-of-interest and environmental noise. The receiver 2 is operable to receive signals from both antennas 3a, 3b forming a composite, received signal (i.e., each of the antennas contributes a signal portion to the composite signal). While not shown in FIG. 1, the receiver 2 also generates internal receiver noise. The internal receiver noise is also a part of the composite signal which is detected by the receiver 2. Also shown in FIG. 1 is a first source 4a transmitting a signal-of-interest 5m and a second source 4b transmitting an undesirable signal 5n (e.g., mobile or cellular radio signal). Signals 5m and 5n are two examples of signals making up signals 5a and 5b, respectively. The challenge faced by existing receivers is to detect a signal-of-interest like signal 5m from among undesirable signals like that of signal 5n within signals 5a. 5b. In one embodiment of the present invention, the receiver 2 is operable to identify such a signal-of-interest 5m by separating the signal-of-interest 5m (and any other signal-of-interest) from signals which make up the environmental noise and internal receiver noise.

Figure 2:
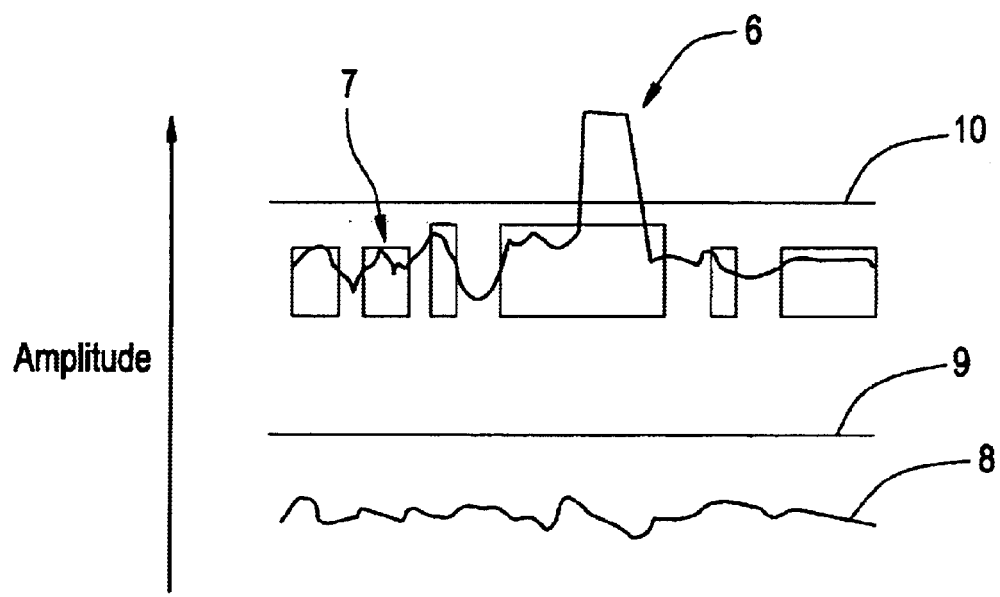
FIG. 2 depicts a simplified graph showing signal, noise and threshold levels according to one embodiment of the present invention.

Referring now to FIG. 2, there is shown a graph which depicts a number of signals, noise and threshold levels. More particularly, FIG. 2 depicts a pulse 6 which corresponds to a signal-of-interest and false pulses 7 which may correspond to signals from mobile devices. Also shown is an internal receiver noise level 8.

Existing ESMs would set a system threshold 9 somewhere above the internal receiver noise 8. Having done so, existing ESMs would identify any signals above such a system threshold as being a signal-of-interest. However, given the fact that mobile devices and other devices emit signals, such as false pulses 7, that are above the, system threshold 9, the system threshold 9 set by existing ESMs can no longer be relied upon to identify true signals-of-interest. Instead, the present invention provides for methods and systems which set a dynamic, system threshold 10 which is at least above the level of; environmental noise. As such, any signal such as pulse 6 which is above the dynamic, system threshold 10 will be identified as a true signal-of-interest.

What follows are some examples of how the present invention sets such a dynamic, system threshold 10.

In order to set a dynamic, system threshold receivers provided by the present invention, such as receiver 2 shown in FIG. 1, are operable to rapidly sample (e.g., approximately 1 ms sampling intervals) the amplitude and interferometer phase of a received signal even if such a signal is below an existing threshold. The interferometer phase is a measurement of the difference in phase between a signal, such as signal 5m in FIG. 1, which is emitted from a signal source (such as signal source 4a) but detected by two or more antennas after the same signal has traversed two or more different paths. Said another way, each of the antennas 5a, 5b shown in FIG. 1 is operable to detect the amplitude and phase of the signal 5m. Though the signal 5m is the same signal when it is transmitted from signal source 4a, its amplitude or phase may change depending on the pathway and channel conditions between signal source 4a and antenna 5a or 5b. It should be noted that although systems provided by the present invention may use two or more antennas to carry out amplitude and/or phase measurements, only one antenna 5a or 5b, strictly speaking, is needed to make amplitude measurements.

Before going further, it should be noted that the signals 5a, 5b (and therefore any sampled signal) do not contain a signal that was originally transmitted from the system 1 (e.g., a radar-like signal). Said another way, the present invention is concerned with identifying substantially unknown signals-of-interest, not known signals generated by the system 1 itself.

Continuing, after sampling the composite signal, receivers; provided by the present invention are further operable to calculate a first average and standard deviation from amplitude signal samples of the sampled signal. At this point in time, the signal samples contain signals-of-interest, environmental and internal receiver noise components.

In one embodiment of the present invention, receiver 2 may first be further operable to identify signal samples that have amplitude levels which are substantially above the first calculated average amplitude. The purpose of this first identification is to identify signals, such as pulse 6 in FIG. 2, that have amplitudes which are substantially above an average amplitude level of a combined signal. For example, a signal which has an amplitude level which is at least 1.4 times a calculated standard deviation above the calculated first average amplitude is probably a signal-of-interest and not environmental noise or the like.

Analyzing amplitude levels is one way to identify signals-of-interest. A second way is to look at phase similarities or differences.

In a further embodiment of the invention, receiver 2 may be operable to identify signal samples that have substantially the same interferometer phase as an adjacent signal sample.

This second identification takes into account the fact that a; signal-of-interest would probably be made up of signal samples whose phase is substantially the same. In contrast, signals from environmental noise sources or the like would not be made of samples whose phase would be substantially the same. In particular, the present invention provides for receivers that compare the phase of adjacent signal samples in order to determine if they are substantially the same.

Assuming that a receiver has identified signal samples having amplitude levels substantially above the calculated first average amplitude and/or signal samples that have substantially the same interferometer phase as an adjacent signal sample, these two signal samples are associated with signals-of-interest. After signal samples associated with these two signal types have been identified, there remains the task of setting a dynamic, system threshold. The present invention provides for receivers which are operable to estimate a noise level using some of the signal samples, wherein the estimation excludes those samples which have been so identified as having amplitude levels substantially above the calculated first average amplitude and/or those samples that have been identified as having substantially the same interferometer phase as an adjacent signal sample. A dynamic, system threshold is then determined from this noise level. Said another way, receivers provided by the present invention estimate a noise level using those signal samples which are not signals-of-interest. In this way, the noise level which is estimated does not include contributions from signals-of-interest but includes only those contributions from signal sources which comprise environmental or internal receiver noise sources.

Alternatively, receivers provided by the present invention may first calculate a second average amplitude (referred to as "second" to distinguish it from the first such calculation) from those signal samples that are not identified as signals-of-interest. After this second average amplitude is calculated, it is used by the inventive receivers to estimate a noise level.

In either case, once a noise level is estimated, receivers provided by the present invention set a dynamic, system threshold above the estimated noise level. Thereafter, receiver 2 may further be operable to recognize that signals above the dynamic, system threshold constitute signals-of-interest.

In sum, the dynamic, system threshold set by receivers provided by the present invention are set above the level of environmental and internal receiver noise sources. This threshold may be revised and updated continually or over set time periods (e.g., a period selected from the range of 3 minutes to at least 15 minutes).

Two common types of signals-of-interest are short duration, high amplitude pulse signals and continuous wave signals. As indicated before, it has been found that signal samples having amplitude levels at least 1.4 times the calculated standard deviation above the calculated first average amplitude are many times signals-of-interest.

The receiver 2 may take the form of many different types of receivers. For example, receiver 2 may comprise an airborne receiver, a fixed-wing or rotary-wing airborne receiver, an airborne or ground-based ESM receiver or a radar warning and detection receiver to name just a few.

In addition to the receiver 2, the systems provided by the present invention may comprise a single pair of antennas 3a, 3b (or 2, 3 or all 4 pairs of antennas 3a–3h).

Referring back to FIG. 1, each pair of antennas 3a–3h generates a signal which is to be processed by the receiver 2. For example, the receiver 2 may be further operable to estimate a noise level from each generated signal and identify which of the noise levels is the highest. This becomes a maximum noise level. Thereafter, the receiver 2 is operable to set a dynamic, system threshold above this maximum noise level.

The discussion above has sought to set forth some examples of the present invention. It should be understood that modifications may be made to these examples without departing from the spirit and scope of the present invention. For example, instead of a helicopter, the system 1 may comprise another rotary aircraft, fixed-wing aircraft (e.g., E-2C, AWACS, fighter aircraft, bombers, transport aircraft) or other airborne vehicles such as drones, missiles, low earth orbiting satellites and the like (all collectively referred to as "airborne device"). The true scope of the present invention which is defined by the claims which follow.

What is claimed is:

1. A system for identifying signals-of-interest comprising:
a receiver operable to;
rapidly sample the amplitude and phase difference of a received signals even if the signals are below an existing system threshold;
calculate a first average and standard deviation from amplitude signal samples;
identify signal samples that have amplitude levels substantially above the calculated, first average amplitude;
identify signal samples that have substantially the same phase difference as an adjacent signal sample;
estimate a noise level using some of the signal samples, wherein the estimation excludes those samples which are identified as having amplitude levels substantially above the calculated first average amplitude and excludes those samples that are identified as having substantially the same phase difference as an adjacent signal sample; and
set a dynamic, system threshold above the estimated noise level.

2. The system as in claim 1 wherein the sampled signals do not contain a signal that was transmitted by the system.

3. The system as in claim 1 wherein the receiver comprises a receiver selected from the group consisting of a fixed-wing airborne receiver and a rotary-wing airborne receiver.

4. The system as in claim 1 wherein the receiver comprises an electronic support measure receiver.

5. The system as in claim 1 wherein the receiver comprises a radar warning receiver.

6. The system as in claim 1 wherein the receiver is further operable to set the dynamic, system threshold over a range consisting of 3 minutes to at least 15 minutes.

7. The system as in claim 1 wherein the estimated noise level comprises at least internal receiver noise.

8. The system as in claim 1 wherein an identified signal sample comprises a signal selected from at least the group consisting of a short duration, high amplitude pulsed signal and a continuous wave signal.

9. The system as in claim 1 wherein the receiver is further operable to:
calculate a second average amplitude from those signal samples that are not identified as having amplitude levels substantially above the calculated first average amplitude or as having substantially the same phase difference as an adjacent signal sample:
estimate a noise level from the second average amplitude; and
set a dynamic, system threshold above the estimated noise level.

10. The system as in claim 1 wherein the receiver is further operable to estimate a noise level using some of the signal samples after excluding those samples identified as having amplitude levels at least 1.4 times the calculated standard deviation above the calculated first average amplitude.

11. The system as in claim 1 further comprising at least a pair of antennas, each antenna operable to contribute a signal portion to samples of the signal.

12. The system as in claim 1 further comprising four pairs of antennas, each pair generating a signal to be processed by the receiver, wherein the receiver is further operable to estimate a noise level from each generated signal, identify a maximum noise level from such estimated noise levels and to set a dynamic, system threshold above the maximum noise level.

13. A method for identifying signals-of-interest comprising:
rapidly sampling the amplitude and phase difference of a received signals even if the signals are below an existing system threshold;
calculating a first average and standard deviation from amplitude signal samples;
identifying signal samples that have amplitude levels substantially above the calculated first average amplitude;
identifying signal samples that have substantially the same phase difference as an adjacent signal sample;
estimating a noise level using some of the signal samples, wherein the estimation excludes those samples which are identified as having amplitude levels substantially above the calculated first average amplitude and excludes those samples that are identified as having substantially the same phase difference as an adjacent signal sample; and
setting a dynamic, system threshold above the estimated noise level.

14. The method as in claim 13 wherein the sampled signals do not contain a signal that was transmitted by the system.

15. The method as in claim 13 further comprising setting the dynamic, system threshold over a range of 3 minutes to at least 15 minutes.

16. The method as in claim 13 wherein the estimated noise level comprises internal receiver noise.

17. The method as in claim 13 wherein an identified signal sample comprises a signal selected from at least the group consisting of a short duration, high amplitude pulsed signal and a continuous wave signal.

18. The method as in claim 13 further comprising:
calculating a second average amplitude from those signal samples that are not identified as having amplitude levels substantially above the calculated first average amplitude or as having substantially the same phase difference as an adjacent signal sample;
estimating a noise level from the second average amplitude; and
setting a dynamic, system threshold above the estimated noise level.

19. The method as in claim 13 further comprising estimating a noise level using some of the signal samples after excluding those samples identified as having amplitude levels at least 1.4 times the calculated standard deviation above the calculated first average amplitude.

20. The method as in claim 13 further comprising contributing a signal portion to samples of the signal.

21. The method as in claim 13 further comprising:
estimating noise levels from signals generated by four pairs of antennas;
calculating a maximum noise level from such estimated noise levels; and
setting a dynamic, system threshold above the maximum noise level.

22. An airborne device comprising:
a receiver operable to:
rapidly sample the amplitude and phase difference of a received signals even if the signals are below an existing system threshold;
calculate a first average and standard deviation from amplitude signal samples;
identify signal samples that have amplitude levels substantially above the calculated, first average amplitude;

identify signal samples that have substantially the same phase difference as an adjacent signal sample;

estimate a noise level using some of the signal samples, wherein the estimation excludes those samples which are identified as having amplitude levels substantially above the calculated first average amplitude and excludes those samples that are identified as having substantially the same phase difference as an adjacent signal sample; and set a dynamic, system threshold above the estimated noise level, wherein the airborne device is selected from the group consisting of a fixed wing aircraft and a rotary wing aircraft.

23. The device as in claim 22 further comprising at least a pair of antennas, each antenna operable to contribute a signal portion to samples of the signal.

24. The device as in claim 22 further comprising four pairs of antennas, each pair generating a signal to be processed by the receiver, wherein the receiver is further operable to estimate a noise level from each generated signal, identify a maximum noise level from such estimated noise levels and to set a dynamic, system threshold above the maximum noise level.

* * * * *